(12) United States Patent
Ono

(10) Patent No.: US 8,462,303 B2
(45) Date of Patent: *Jun. 11, 2013

(54) LIQUID CRYSTAL DISPLAY DEVICE

(75) Inventor: Kikuo Ono, Mobara (JP)

(73) Assignees: Hitachi Displays, Ltd., Chiba (JP); Panasonic Liquid Crystal Display Co., Ltd, Hyogo-Ken (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/605,164

(22) Filed: Sep. 6, 2012

(65) Prior Publication Data

US 2012/0327323 A1    Dec. 27, 2012

Related U.S. Application Data

(63) Continuation of application No. 12/912,801, filed on Oct. 27, 2010, now Pat. No. 8,284,366.

(30) Foreign Application Priority Data

Oct. 30, 2009    (JP) ................................. 2009-250172

(51) Int. Cl.
*G02F 1/1343*    (2006.01)
(52) U.S. Cl.
USPC ........................................... 349/141
(58) Field of Classification Search
USPC ........................................... 349/141
See application file for complete search history.

(56) References Cited

U.S. PATENT DOCUMENTS

| 7,453,539 | B2 | 11/2008 | Matsuoka | |
| 8,284,366 | B2 * | 10/2012 | Ono | 349/141 |
| 2009/0180069 | A1 | 7/2009 | Nishimura | |

FOREIGN PATENT DOCUMENTS

JP    2009-168878    7/2009

* cited by examiner

*Primary Examiner* — James Dudek
(74) *Attorney, Agent, or Firm* — Antonelli, Terry, Stout & Kraus, LLP.

(57) ABSTRACT

A liquid crystal display device includes liquid crystals which are sandwiched between a first substrate and a second substrate, wherein on the first substrate is provided, a thin-film transistor, a drain electrode line to which a video signal is applied, a gate electrode line to which a gate signal is applied, a pixel electrode and a common electrode consisting of transparent conductive films, a first insulating layer formed between the pixel electrode and the common electrode, a and second insulating layer formed between the common electrode and the first substrate, wherein on the second substrate is provided, a color filter which includes a plurality of coloring layers of different colors, the coloring layers having different light transmittances, wherein a common line consisting of a metal to which a common voltage is applied, the common line being formed between the first substrate and the second insulating layer.

6 Claims, 6 Drawing Sheets

LIQUID CRYSTAL DISPLAY DEVICE

CROSS-REFERENCE TO RELATED APPLICATION

This application is a continuation application of U.S. Ser. No. 12/912,801, filed Oct. 27, 2010, now U.S. Pat. No. 8,284,366,the contents of which are incorporated herein by reference.

The present application claims priority from Japanese application JP2009-250172 filed on Oct. 30, 2009, the content of which is hereby incorporated by reference into this application.

BACKGROUND OF THE INVENTION

1. Field of the Invention

The present invention relates to a liquid crystal display device.

2. Description of the Related Art

In the related art, liquid crystal display devices include a TFT substrate in which thin-film transistors (TFT) for driving liquid crystals are formed and a color filter substrate in which color filters are formed, and liquid crystals are interposed between the two substrates. In such liquid crystal display devices, a driving mode where images are displayed by applying a transverse electric field to the liquid crystals is referred to as an In-Plane Switching (IPS) mode or a transverse electric field driving mode. Such display devices are known to have a wide viewing angle performance.

JP 2009-168878 A discloses a liquid crystal display device in which metal wirings are electrically connected to a common electrode made from ITO (Indium Tin Oxide). Since ITO has a high resistance, the potentials of the common electrode can be made uniform by connecting the metal wirings having a low resistance to the common electrode.

Moreover, it is also known that even when a transparent common electrode is connected to the metal wirings so as to reduce resistance in order to reduce power consumption by increasing the aperture ratio of the liquid crystal display device, the number of metal wirings may be reduced according to need rather than forming the metal wirings over all the pixels.

Since it is difficult to form the metal wirings only in regions such as a black matrix and a transistor which naturally cannot transmit light therethrough, the metal wirings should be formed so as to pass a pixel region. Thus, the formed metal wirings decrease the aperture ratio, and accordingly, luminance decreases. However, it is desirable to suppress the decrease in luminance as much as possible.

SUMMARY OF THE INVENTION

The invention aims to suppress the decrease in luminance when metal wirings connected to a common electrode are formed in order to realize a wide-viewing angle IPS-mode liquid crystal display device having a high aperture ratio performance.

(1) A liquid crystal display device including: liquid crystals; a circuit layer which includes a thin-film transistor and a plurality of wirings, the plurality of wirings being formed from metal; a pixel electrode and a common electrode which are stacked on each other between the liquid crystals and the circuit layer with an insulating film disposed therebetween in order to drive the liquid crystals in a transverse electric field driving mode, and each of which is formed from a transparent conductive film; a color filter which includes a plurality of coloring layers of different colors, the coloring layers having different transmittances; and a connection wiring, wherein the plurality of wirings includes a common wiring which is disposed so as not to face the coloring layer having the highest transmittance among the plurality of coloring layers but to face any one of the other coloring layers, and wherein the connection wiring connects the common electrode and the common wiring to each other. According to the invention, since the metal wirings are disposed so as not to face the coloring layer having the highest luminance, and the luminance of light blocked by the metal wirings is naturally low, it is possible to suppress the decrease in the luminance of the liquid crystal display device.

(2) In the liquid crystal display device according to (1), the thin-film transistor may include a gate electrode, a source electrode, and a drain electrode, and a part of the common electrode and a part of the common wiring may be positioned above the gate electrode, and a connecting portion of the connection wiring connected to the common electrode and a connecting portion of the connection wiring connected to the common wiring may be positioned above the gate electrode.

(3) In the liquid crystal display device according to (2), the circuit layer may include a semiconductor layer, and the source electrode, the drain electrode, and the common wiring may be formed on the semiconductor layer so as to be in contact therewith.

(4) In the liquid crystal display device according to any one of (1) to (3), the pixel electrode may be disposed on a side of the insulating film close to the liquid crystals, and the connection wiring may be formed from the transparent conductive film and may include a portion which is disposed on the insulating film so as to extend along the pixel electrode and a portion which passes through the insulating film so as to be connected to the common electrode.

(5) In the liquid crystal display device according to any one of (1) to (4), the plurality of coloring layers may include a red coloring layer, and the common wiring may be disposed so as to face the red coloring layer.

DETAILED DESCRIPTION OF THE INVENTION

Hereinafter, the embodiment of the invention will be described with reference to the drawings.

Figure 1:
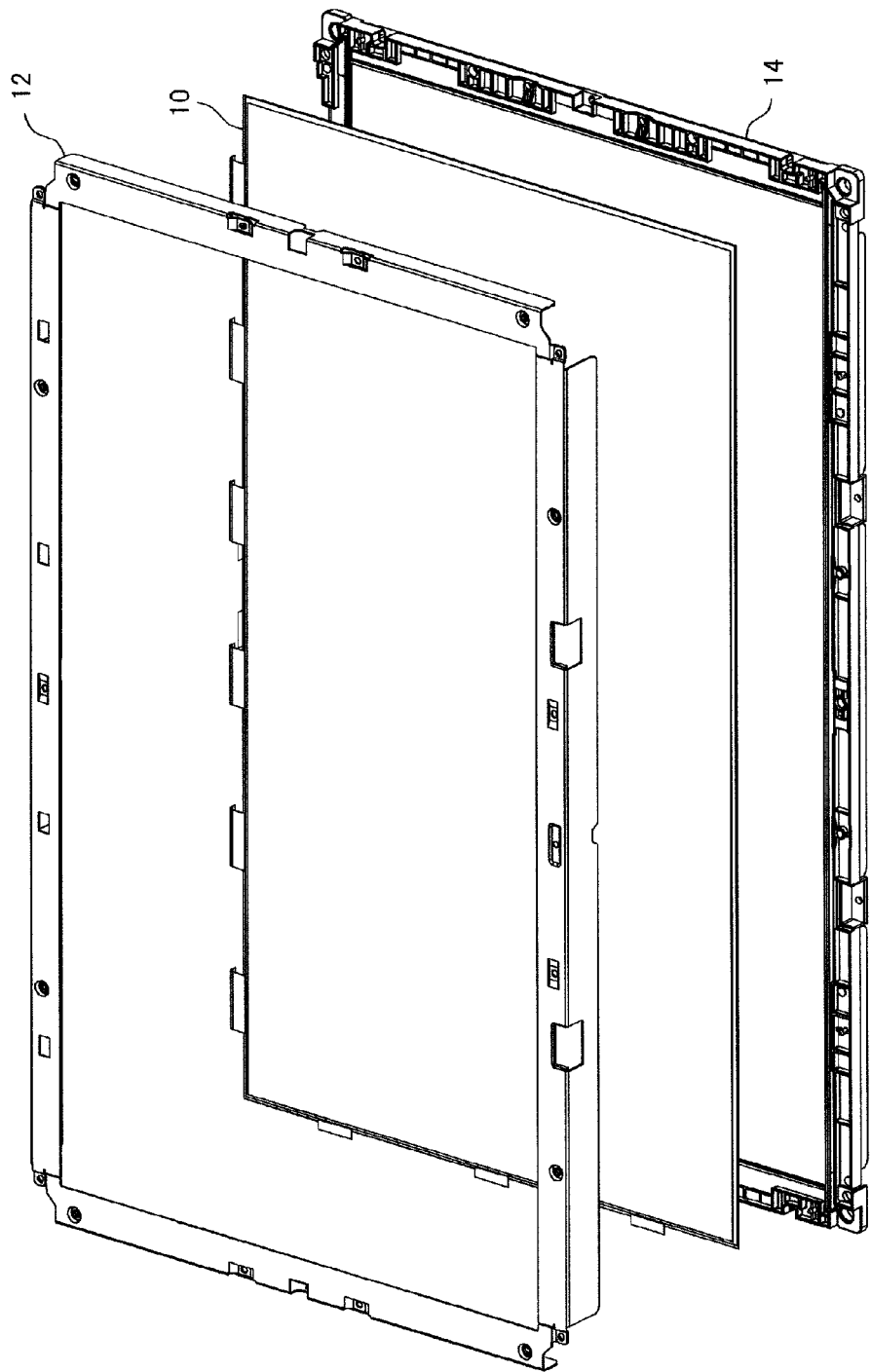
FIG. 1 is an exploded perspective view showing a liquid crystal display device according to an embodiment of the invention.

FIG. 1 is an exploded perspective view showing a liquid crystal display device according to an embodiment of the invention. The liquid crystal display device includes a liquid crystal display panel 10. The liquid crystal display panel 10 is supported by an upper frame 12 and a lower frame 14.

Figure 2:
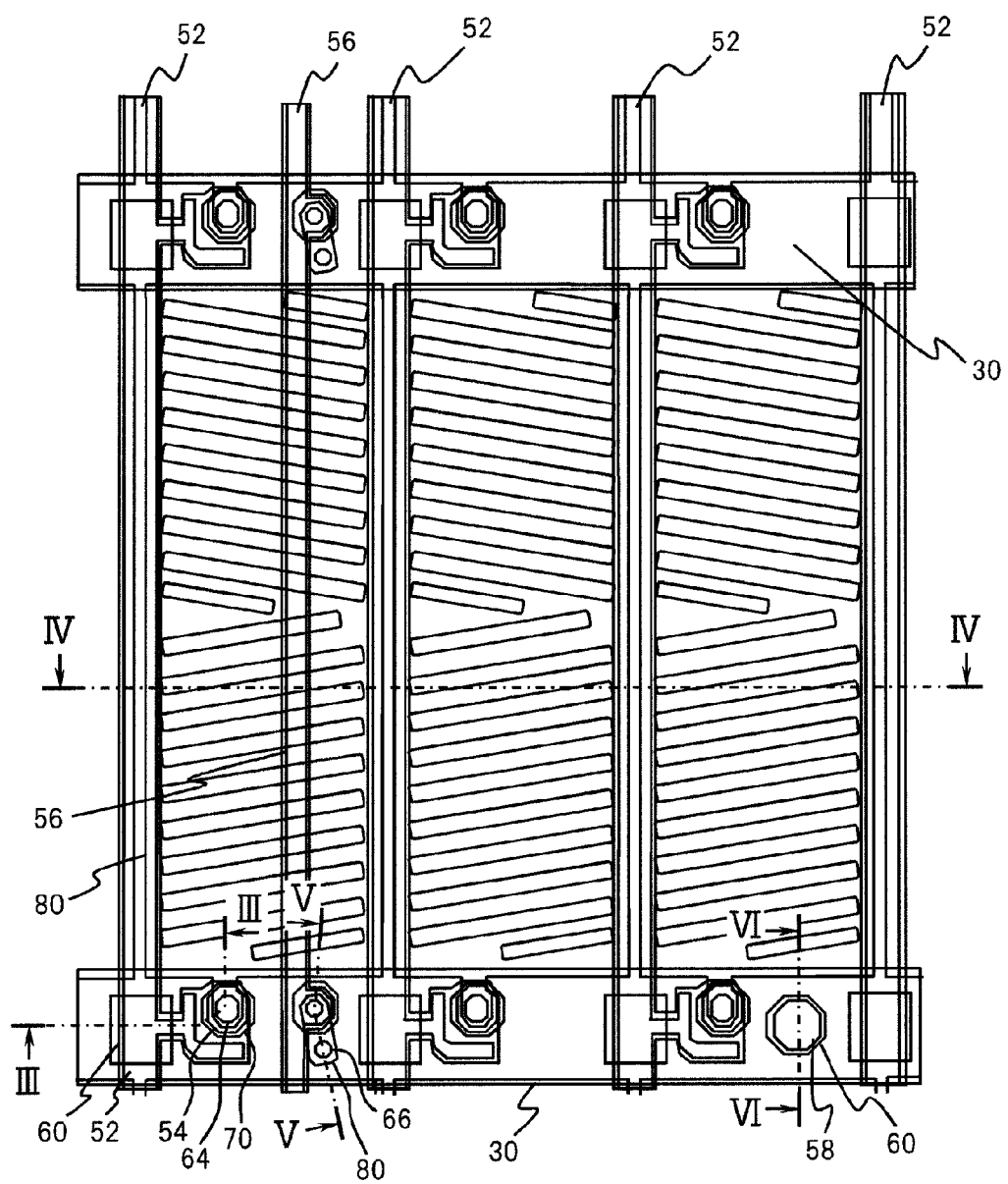
FIG. 2 is a top view showing a pixel electrode, a common electrode, and a circuit layer of the liquid crystal display device shown in FIG. 1.
Figure 3:
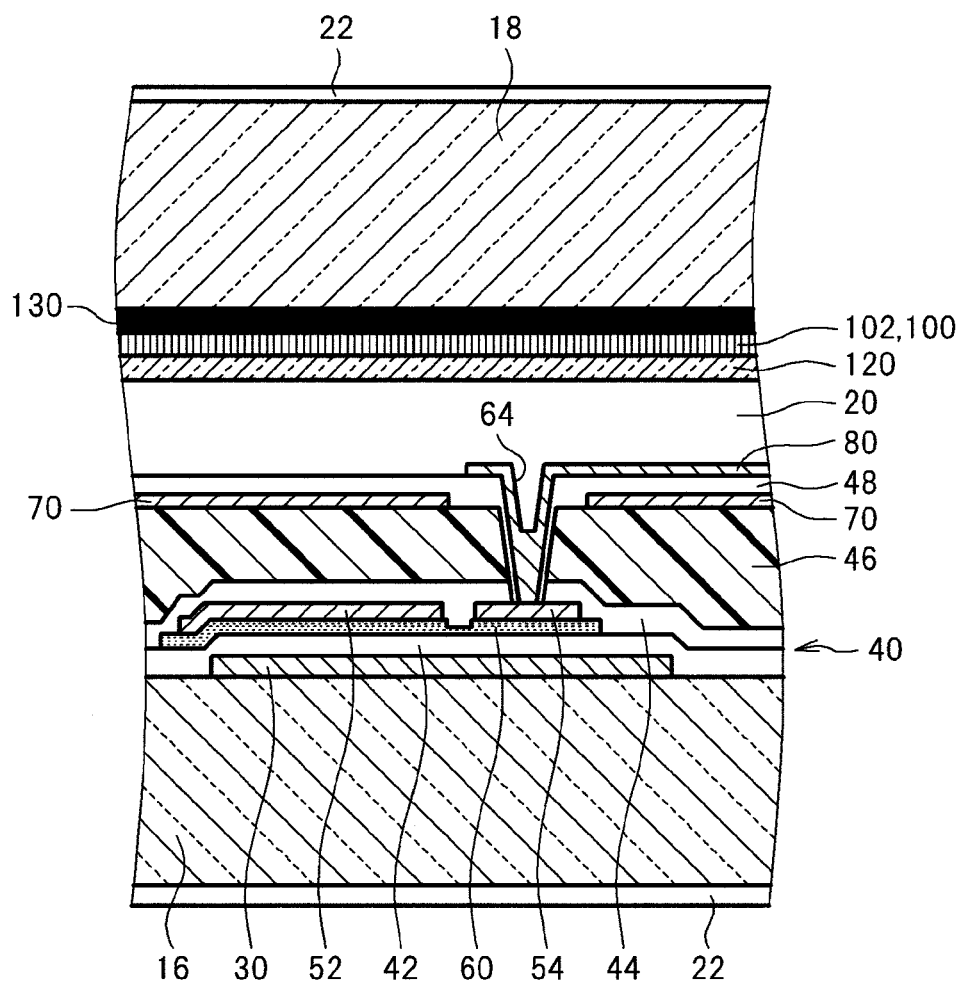
FIG. 3 is a sectional view of the liquid crystal display device taken along the line in FIG. 2.
Figure 4:
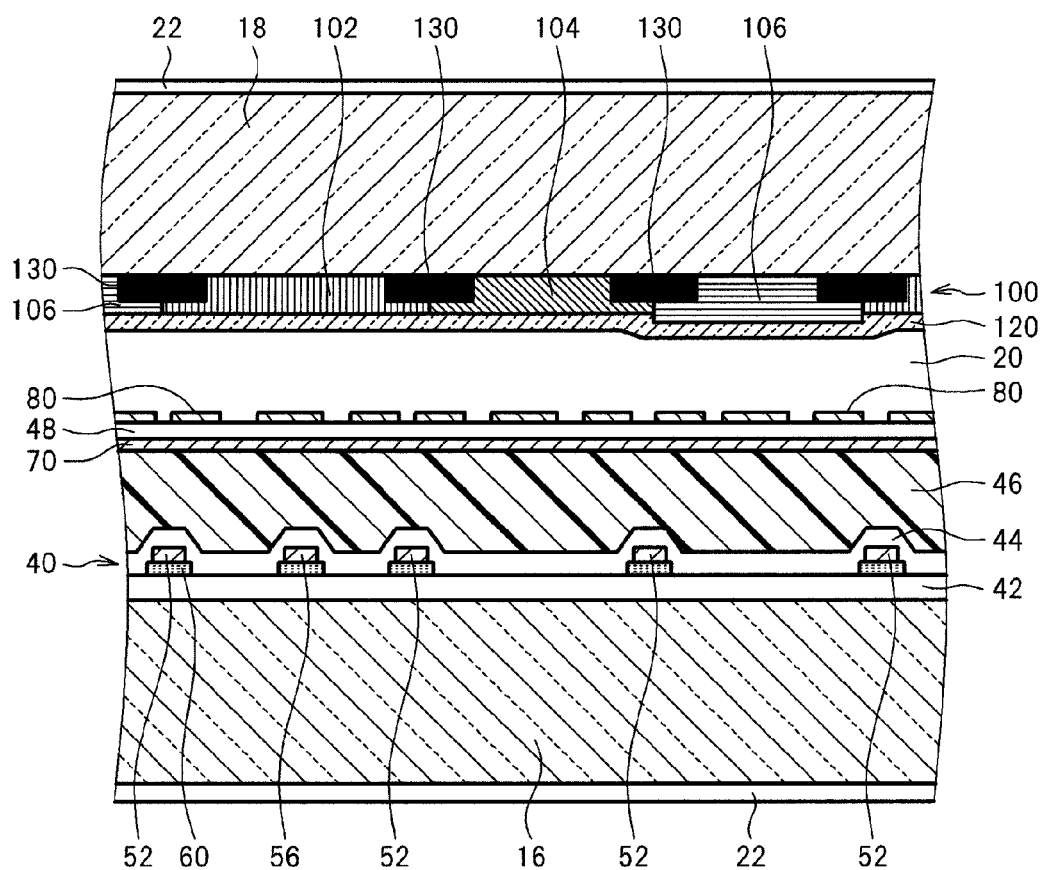
FIG. 4 is a sectional view of the liquid crystal display device taken along the line IV-IV in FIG. 2.
Figure 5:
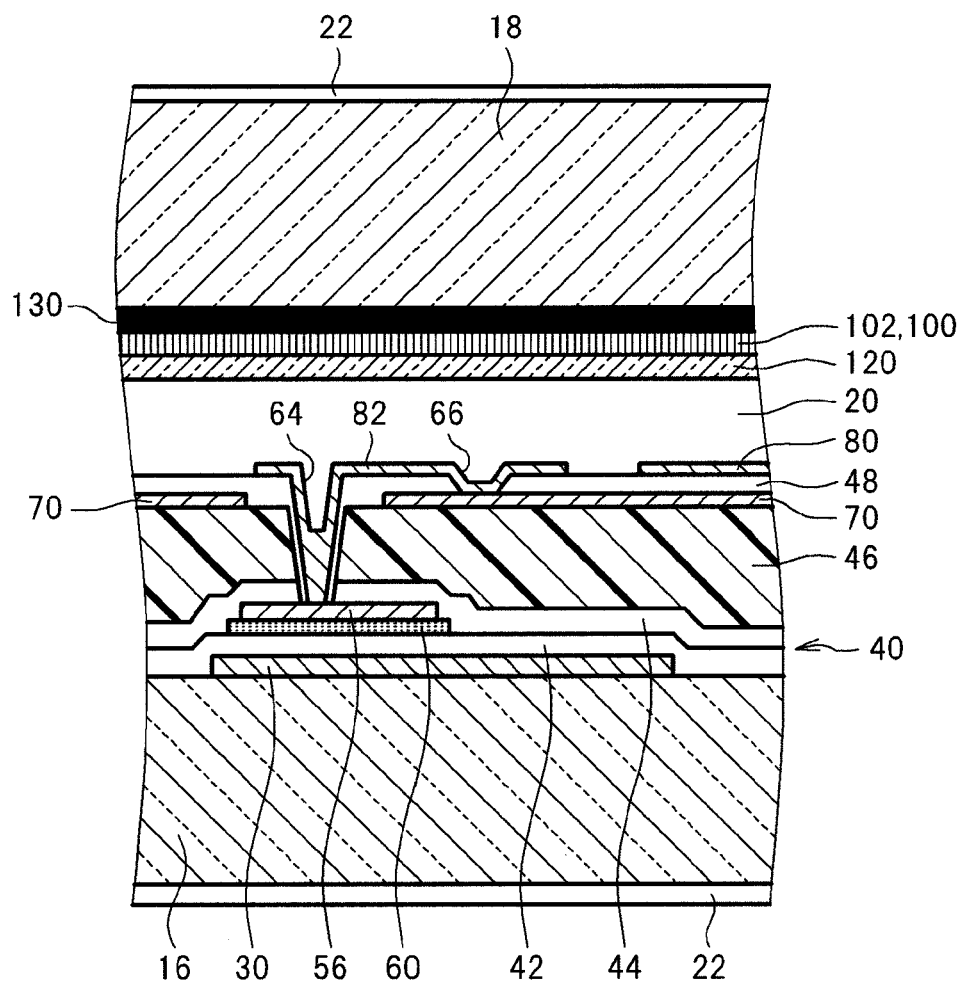
FIG. 5 is a sectional view of the liquid crystal display device taken along the line V-V in FIG. 2.
Figure 6:
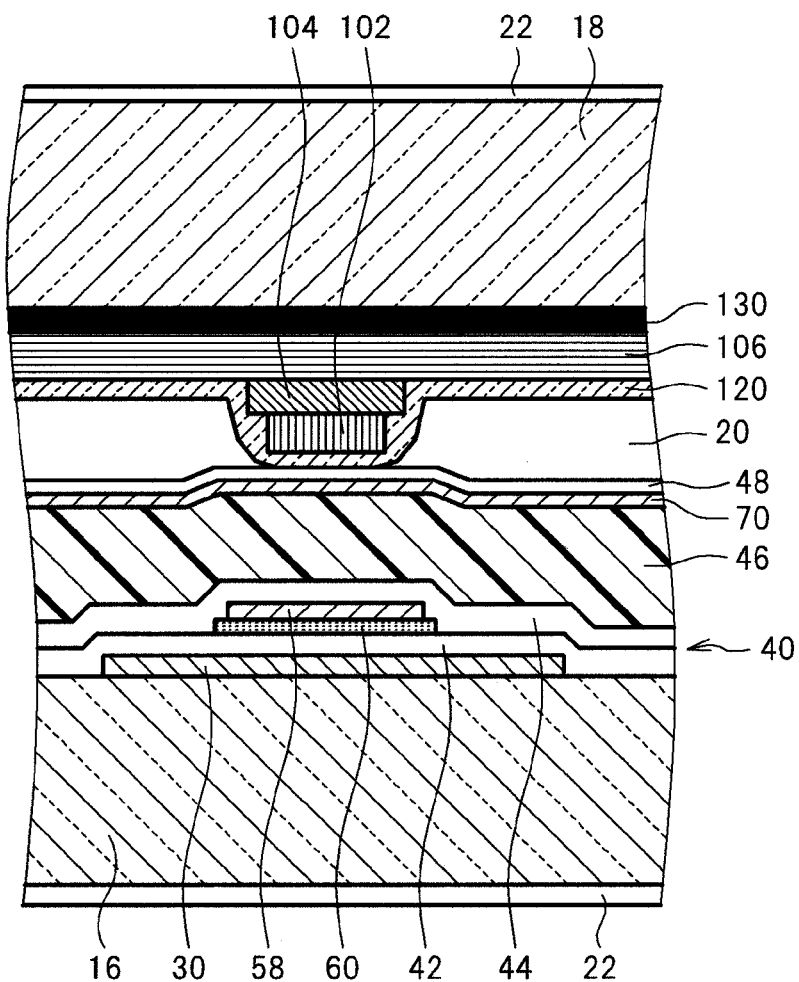
FIG. 6 is a sectional view of the liquid crystal display device taken along the line VI-VI in FIG. 2.

FIG. 2 is a top view showing a pixel electrode, a common electrode, and a circuit layer of the liquid crystal display device shown in FIG. 1. FIG. 3 is a sectional view of the liquid crystal display device taken along the line III-III in FIG. 2. FIG. 4 is a sectional view of the liquid crystal display device taken along the line IV-IV in FIG. 2. FIG. 5 is a sectional view of the liquid crystal display device taken along the line V-V in FIG. 2. FIG. 6 is a sectional view of the liquid crystal display device taken along the line VI-VI in FIG. 2.

The liquid crystal display device includes a pixel electrode 80 and a common electrode 70. The pixel electrode 80 and the common electrode 70 are formed from a transparent conductive film. The pixel electrode 80 and the common electrode 70 are stacked on each other with an interlayer insulating film 48 disposed therebetween in order to drive liquid crystals 20 in the transverse electric field driving mode. The pixel electrode 80 is disposed on a side of the interlayer insulating film 48 close to the liquid crystals 20.

The liquid crystal display device includes a color filter 100. The color filter 100 includes a plurality of coloring layers 102, 104, and 106 of different colors (see FIG. 4). The transmittances of the coloring layers 102, 104, and 106 are different from each other. The plurality of coloring layers 102, 104, and 106 includes a red coloring layer 102.

The liquid crystal display device includes a circuit layer 40. The circuit layer 40 is disposed under the liquid crystals 20, the pixel electrode 80, and the common electrode 70. The circuit layer 40 includes thin-film transistors. As shown in FIG. 3, the thin-film transistors each include a gate electrode 30, a source electrode 54, a drain electrode 52, and a semiconductor layer 60. The circuit layer 40 includes a gate insulating film 42 that covers the gate electrode 30. The source electrode 54 and the drain electrode 52 are formed on the semiconductor layer 60 so as to be in contact therewith. A part of the common electrode 70 is positioned above the gate electrode 30.

The circuit layer 40 includes a plurality of wirings made from metal. The plurality of wirings includes a common wiring 56 (see FIGS. 4 and 5). The common wiring 56 is formed on the semiconductor layer 60 so as to be in contact therewith. A part of the common wiring 56 is positioned above the gate electrode 30. As shown in FIG. 4, the common wiring 56 is disposed so as not to face the green coloring layer 104, which has the highest transmittance among the plurality of coloring layers 102, 104, and 106, but to face any one of the other coloring layers (in the present embodiment, the red coloring layer 102).

According to the present embodiment, since the common wiring 56 made from metal is disposed so as not to face the green coloring layer 104 which has the highest luminance, and the luminance of light blocked by the metal wirings is naturally low, it is possible to suppress the decrease in the luminance of the liquid crystal display device.

As shown in FIG. 5, the liquid crystal display device includes a connection wiring 82. The connection wiring 82 connects the common electrode 70 and the common wiring 56 to each other. A connecting portion of the connection wiring 82 connected to the common electrode 70 is positioned above the gate electrode 30. A connecting portion of the connection wiring 82 connected to the common wiring 56 is positioned above the gate electrode 30. The connection wiring 82 is made from a transparent electrode film and includes a portion which is disposed on the interlayer insulating film 48 so as to extend along the pixel electrode 80 and a portion which passes through the interlayer insulating film 48 so as to be connected to the common electrode 70.

[Embodiments]

Hereinafter, the embodiment of the invention will be described in detail.

The liquid crystal display panel 10 includes a first substrate 16 and a second substrate 18. The first substrate 16 and the second substrate 18 are transparent substrates (for example, glass substrates). Liquid crystals 20 are arranged between the first substrate 16 and the second substrate 18. The first substrate 16 and the second substrate 18 have a surface opposite to the liquid crystals 20, to which a polarizing plate 22 is attached in a cross-Nicol state.

A thin-film transistor is formed on a surface of the first substrate 16 facing the liquid crystals 20. The thin-film transistor is a switch for controlling the driving of the liquid crystals 20. The thin-film transistor is a bottom-gate type transistor in which the gate electrode 30 to which a scanning voltage for control is applied is disposed on the bottom side. The gate electrode 30 is formed on the first substrate 16. The gate insulating film 42 made from inorganic material (semiconductor oxide such as $SiO_2$ or semiconductor nitride such as SiN) is formed by a plasma CVD process or the like so as to cover the gate electrode 30. The semiconductor layer 60 made from amorphous silicon or microcrystalline silicon is formed on the gate insulating film 42. The source electrode 54 to which a pixel potential is output and the drain electrode 52 to which a video signal is applied are formed on the semiconductor layer 60. A protective insulating layer 44 made from inorganic material (semiconductor oxide such as $SiO_2$ or semiconductor nitride such as SiN) is formed so as to cover the source electrode 54, the drain electrode 52, and the semiconductor layer 60. The temperature-associated contamination of the semiconductor layer 60 is prevented by the protective insulating layer 44.

When a gate voltage is applied to the gate electrode 30, the resistance of the semiconductor layer 60 between the drain electrode 52 and the source electrode 54 to which a video signal voltage is applied decreases. As a result, an electric field is generated between the pixel electrode 80 which is a second transparent conductive film connected to the source electrode 54 and the common electrode 70 which is a first transparent conductive film to which a common voltage is applied. The electric field is applied to the liquid crystals 20, whereby the transmittance of the liquid crystals 20 is changed, and images are displayed.

As for the gate electrode 30, the drain electrode 52, and the source electrode 54, low-resistance materials are required as the wiring materials. Therefore, a conductive film made from Cu (copper) or a laminated film of Cu and Mo (molybdenum) below Cu is coated thereon by a sputtering method.

An organic insulating film 46 is disposed above the thin-film transistor (on the protective insulating layer 44). The organic insulating film 46 is a low-permittivity film having relative permittivity of 4 or lower.

The common electrode 70 is formed on the organic insulating film 46. The interlayer insulating film 48 is formed on the common electrode 70. The interlayer insulating film 48 is constituted by an insulating film made from inorganic material such as SiN. Further, the pixel electrode 80 which is constituted by the second transparent conductive film is formed on the interlayer insulating film 48. The common electrode 70 and the pixel electrode 80 are formed from ITO (Indium Tin Oxide) or indium zinc oxide by a sputtering method or the like.

In a pixel region, the pixel electrode 80 is connected to the source electrode 54 through the interlayer insulating film 48, the common electrode 70, the organic insulating film 46, and an opening of the protective insulating layer 44. Through this connection, the pixel potential is supplied to the liquid crystals 20. The electric field between the pixel electrode 80 and the common potential of the common electrode 70 present thereunder with the interlayer insulating film 48 disposed therebetween is applied to the liquid crystals 20, whereby images are displayed.

A black matrix 130 is disposed on a surface, close to the liquid crystals 20, of the second substrate 18 which is disposed at a position facing the first substrate 16 with the liquid crystals 20 disposed therebetween. The black matrix 130 is formed from resin including black pigment and carbon. The black matrix 130 prevents light from moving towards a channel region of the semiconductor layer 60. Therefore, the top-view shape of the black matrix 130 is an island-like form or a strip-like form.

The color filter 100 is formed on a side of the black matrix 130 close to the liquid crystals 20. The color filter 100 includes a plurality of coloring layers (for example, coloring layers of the three colors red, green, and blue). The color filter 100 in the sectional structure shown in FIG. 3 is a coloring layer in which red pigment is spread.

On a surface of the second substrate 18 close to the liquid crystals 20, an overcoat film 120 made from organic material is formed so as to cover scratches on the surface thereof. The overcoat film 120 is formed from transparent material so as not to contain contaminants such as pigment which is ionized and dissolved into the liquid crystals 20.

FIG. 4 shows a sectional structure of three consecutive pixels taken along the extending direction of the gate electrode 30 (see FIG. 2) of the liquid crystal display panel in which coloring layers of three colors are arranged on the second substrate 18 in a vertical stripe form. The red coloring layer 102 containing red pigment, the green coloring layer 104 containing green pigment, and the blue coloring layer 106 containing blue pigment are formed on the second substrate 18 along the extending direction of the gate electrode 30. The boundary of the pixels corresponds to the drain electrode 52 on the first substrate 16 with the liquid crystals 20 interposed therebetween and the black matrix 130 on the second substrate 18.

The liquid crystals 20 are driven by an electric field applied between the common electrode 70 which is constituted by the first transparent conductive film made from ITO (Indium Tin Oxide) and the pixel electrode 80 which is constituted by the second transparent conductive film made from ITO. In this case, the drain electrode 52 generates a noise electric field since the video signals for pixels other than the corresponding pixel are transmitted thereto. On the other hand, since the common voltage is always applied to the common electrode 70, the common electrode 70 has the role of an upper shield electrode that shields the drain electrode 52 with the aid of the organic insulating film 46 having low permittivity. Therefore, it is possible to shorten the gap between neighboring pixel electrodes 80 interposing the drain electrode 52. Accordingly, it is possible to shorten the width of the black matrix 130 partitioning the pixels and to provide a high aperture ratio.

The common electrode 70 has a high resistance since it is constituted by a transparent conductive film such as ITO. Thus, when the size of the liquid crystal display device increases, the potential of the common electrode 70 will be delayed. Therefore, in the related art, in the post-processing of the common electrode 70, a low-resistance wiring material such as Cu (copper) is continuously coated by a sputtering method, and this coating is patterned on the transparent common electrode 70.

However, there is a problem with the sputtering of the low-resistance wiring material such as Cu in that it adds an additional process because the sputtering apparatus for the common electrode 70 of ITO is different from that used for sputtering the low-resistance wiring material.

In the present embodiment, the common wiring 56 which is formed by the same process as the drain electrode 52 is disposed in a pixel having the red coloring layer 102 of FIG. 4 at a position where it is interposed between two drain electrodes 52 which are the pixel region. The common wiring 56 is not formed in the pixel regions of the other coloring layers (namely, the green coloring layer 104 and the blue coloring layer 106). As can be understood from the top view of FIG. 2, in a liquid crystal display device which realizes a color display using a color filter of the three colors, the common wiring 56 is formed in the pixel region of only one coloring layer. As shown in FIG. 3, the common electrode 70 is disposed so as to cover the drain electrode 52 in the pixel region. Even if the common wiring 56 is formed from a conductive material having a relatively high resistance such as ITO, it is not necessary to form the common wiring 56 over all the pixels but it may be disposed for every minimum unit of the coloring layers.

Therefore, when the color filter includes coloring layers of the three colors red, green, and blue, the common wiring 56 may be formed in one pixel region among the three pixel regions. Moreover, when the color filter includes coloring layers of the four colors red, green, blue, and yellow, or the four colors red, green, yellow, and white, the common wiring 56 may be formed in one pixel region among the four pixel regions. Furthermore, when the color filter includes coloring layers of the five colors red, green, blue, yellow, and cyan, the common wiring 56 may be formed in one pixel region among the five pixel regions.

In the present embodiment in which the color filter 100 of the three colors red, green, and blue is used, the common wiring 56 is disposed in the pixel region in which the red coloring layer 102 is formed as shown in FIG. 4. This configuration is based on the following factors that realize the high aperture ratio.

A first factor is the different transmittance of each color. When a liquid crystal display device uses the color filter 100 of the three colors red, green, and blue, the transmittance of the colors as well as the transmittance of the pigment mixed into the coloring layers are ranked as green, red, and blue. In the present embodiment, when all the pixels display white, namely, the transmittance of the pixels of the colors red, green, and blue are maximized, the luminance is set to 500 cd/m$^2$. Among these colors, the luminances are 344 cd/m$^2$ for the green pixel, 98 cd/m$^2$ for the red pixel, and 58 cd/m$^2$ for the blue pixel. As can be understood from this, when the common wiring 56 is disposed in the green pixel, the white luminance will be lowest, and the liquid crystal display device will become darker. Thus, in order to compensate for this power consumption will increase, which is not desirable.

On the other hand, in the present embodiment, the thicknesses of the coloring layers are different from color to color. As shown in FIG. 4, the blue coloring layer 106 is set so as to be thicker than the coloring layers of the other colors. This is because the birefringence transmittance of the liquid crystals 20 exhibits wavelength dependence. The wavelength of blue light is short. Thus, when the thickness of the coloring layers of each color is the same, the transmittance of the pixel region corresponding to blue light will decrease under the same driving voltage. This may decrease the luminance of the liquid crystal display device. For this reason, the blue coloring layer 106 is made thick, and the cell gap of the liquid crystal materials is made thin. In order to secure the cell gap which is the thickness of the liquid crystals 20 and which is the gap between the first substrate 16 and the second substrate 18, the coloring layers of each color on the second substrate 18 are overlapped with each other. The overlapping region is positioned in the blue pixel in which the coloring layer is thick. A pedestal electrode 58 is formed in the first substrate 16 so as to correspond to a portion where the red coloring layer 102, the green coloring layer 104, and the blue coloring layer 106 of the color filter 100 are overlapped with each other. The pedestal electrode 58 is formed on the gate electrode 30 which is in the light-shielding region. The sectional structure thereof is shown in FIG. 6.

Since the pedestal electrode 58 is formed on the gate electrode 30 of the blue pixel, it is not possible to form a wiring region in which the common wiring 56 crosses over the gate electrode 30. Therefore, in the present embodiment, the common wiring 56 is formed in the pixel region where the red coloring layer 102 is formed.

As describe above, in the present embodiment, the common wiring 56 is disposed in the pixel region of one coloring layer among the coloring layers of the three colors, and specifically, is disposed in the pixel region of the red coloring layer 102 having the low transmittance rather than the pixel region of the green coloring layer 104 having the high transmittance of the color filter 100 in which the common wiring 56 is disposed. Thus, it is possible to realize a high aperture ratio, increase white luminance, and realize low power consumption.

FIG. 5 is a sectional view taken along the line V-V in FIG. 2. This sectional view shows connection regions of the common wiring 56 and the common electrode 70. The connection regions occupy a wider area than the common wiring 56 of a transmitting region of a pixel in order to form a connection opening. Therefore, the black matrix 130 is formed, and the connection regions are formed on the light-shielded gate electrode 30. By doing so, the aperture ratio can be increased. This is one of the features of the present embodiment for realizing a high aperture ratio.

The common wiring 56 and the common electrode 70 are connected as follows. The common wiring 56 that crosses the gate electrode 30 of a pixel where the red coloring layer 102 is formed is connected to the connection wiring 82 which is formed from the second transparent conductive film by the same process as the pixel electrode 80 through the protective insulating layer 44 covering the common wiring 56, the organic insulating film 46, and a first opening 64 of the interlayer insulating film 48. Subsequently, the connection wiring 82 is connected to the common electrode 70 through a second opening 66 of the interlayer insulating film 48 covering the common electrode 70. In this way, the wiring delay of the common electrode 70 can be reduced, and good image quality can be obtained. Moreover, these connection regions are formed on the non-transparent gate electrode 30, and the aperture ratio will not decrease. Thus, it is possible to provide a liquid crystal display device having a high aperture ratio, a high luminance, and a low power consumption.

FIG. 6 is a sectional view taken along the line VI-VI in FIG. 2. This sectional view shows a structure that fixes the thickness of the liquid crystals 20 between the first substrate 16 and the second substrate 18. The blue coloring layer 106 is formed by patterning the red coloring layer 102 and the blue coloring layer 104 so as to have a relatively high step. Moreover, on the first substrate 16, the pedestal electrode 58 is formed on the semiconductor layer 60 by the same process as the drain electrode 52, whereby the thickness of the liquid crystals 20 is determined.

In the present embodiment described above, the transparent common electrode 70 of the liquid crystal display panel 10 is connected to the low-resistance common wiring 56 in order to decrease the resistance thereof. Since light cannot be transmitted through the common wiring 56, the common wiring 56 is only disposed in the region of the red coloring layer 102 without being disposed in the green coloring layer 104 which has the highest transmittance among the pixel regions of the coloring layers of the colors red, green, and blue. In addition, by providing the connection regions of the common wiring 56 and the common electrode 70 on the gate electrode 30, it is possible to provide a liquid crystal display device having a high aperture ratio and a low power consumption. The liquid crystal display device of the present embodiment further includes the configurations (for example, an alignment film) of the known liquid crystal display device, and detailed description thereof will be omitted.

The invention is not limited to the embodiment described above but can be modified in various ways. For example, the configurations described in the embodiment can be substituted with substantially the same configurations, configurations capable of achieving the same operations and effects, or configurations capable of attaining the same object.

What is claimed is:

1. A liquid crystal display device comprising:
liquid crystals which are sandwiched between a first substrate and a second substrate;
on the first substrate is provided, a thin-film transistor, a drain electrode line to which a video signal is applied, a gate electrode line to which a gate signal is applied, a pixel electrode and a common electrode consisting of transparent conductive films, a first insulating layer formed between the pixel electrode and the common electrode, a and second insulating layer formed between the common electrode and the first substrate;
on the second substrate is provided, a color filter which includes a plurality of coloring layers of different colors, the coloring layers having different light transmittances; and
a common line consisting of a metal to which a common voltage is applied, the common line being formed between the first substrate and the second insulating layer,
wherein an opening portion is formed in the first and second insulating layers, the common line and the common electrode are electrically connected to each other through the opening portion, and the opening portion is disposed to face one of the coloring layers other than a coloring layer having a highest light transmission rate.

2. The liquid crystal display device according to claim 1, wherein the thin-film transistor includes the gate electrode, the source electrode, and the drain electrode; and
wherein a part of the common electrode and a part of the common line are positioned above the gate electrode.

3. The liquid crystal display device according to claim 1, wherein the thin-film transistor includes a semiconductor layer, the semiconductor layer consisting of amorphous silicon or microcrystalline silicon.

4. The liquid crystal display device according to claim 1, wherein the common line is formed in a same process as formation of the drain electrode line.

5. The liquid crystal display device according to claim 1, wherein the plurality of coloring layers include a red coloring layer; and
wherein the opening portion is disposed so as to face the red coloring layer.

6. The liquid crystal display device according to claim 1, wherein the first insulating layer consists of an inorganic material and the second insulating layer consists of organic material.

\* \* \* \* \*